Figure 1:
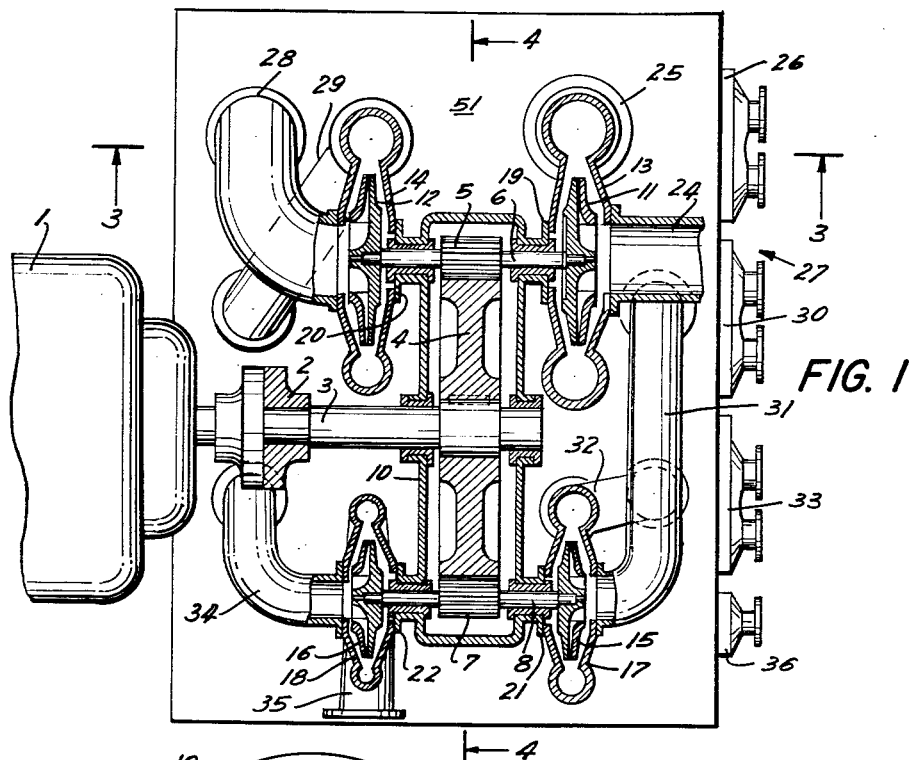

Sept. 26, 1961        O. SCHIERL        3,001,692

MULTISTAGE COMPRESSORS

Filed Aug. 22, 1958        3 Sheets-Sheet 1

INVENTOR.
Otto Schierl
BY Michael S. Striker
Attorney

Sept. 26, 1961      O. SCHIERL      3,001,692

MULTISTAGE COMPRESSORS

Filed Aug. 22, 1958      3 Sheets-Sheet 2

INVENTOR.
Otto Schierl
BY Michael S. Striker
Attorney

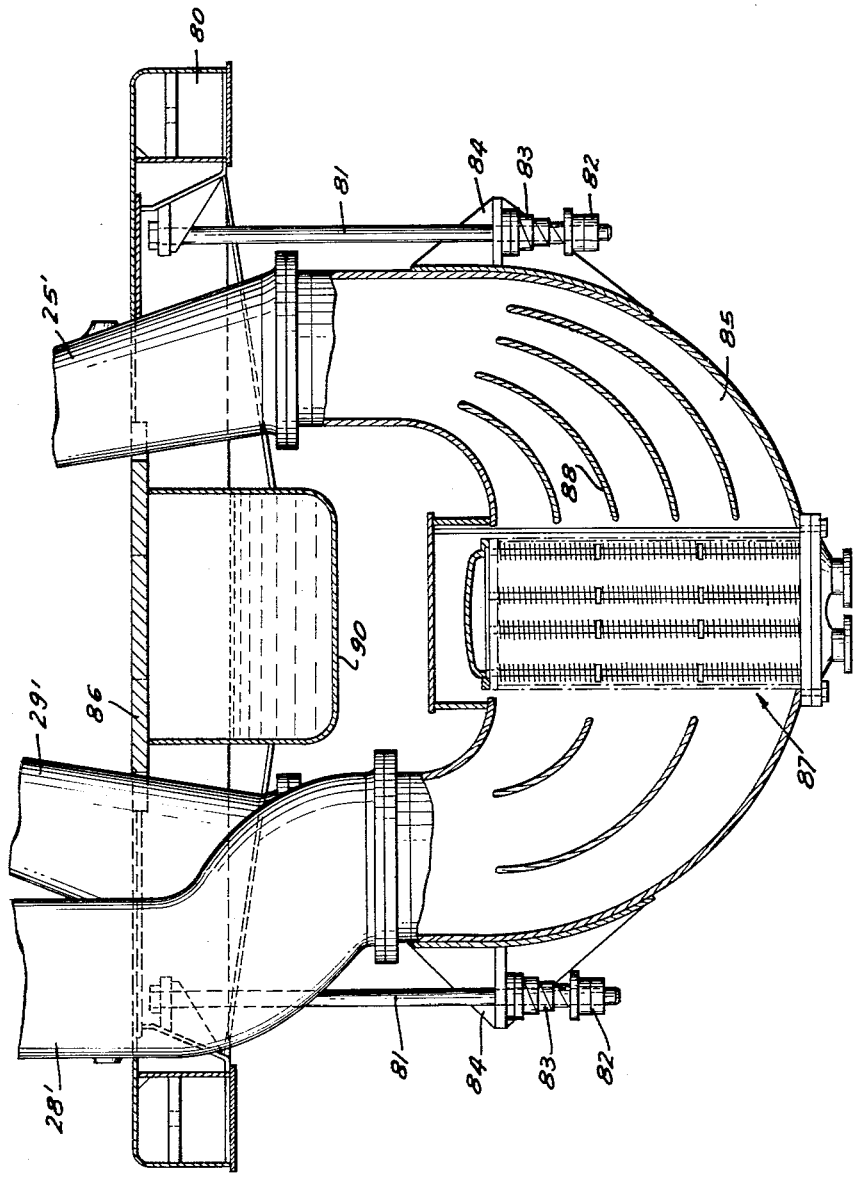

United States Patent Office 3,001,692
Patented Sept. 26, 1961

3,001,692
MULTISTAGE COMPRESSORS
Otto Schierl, Leonhardtstrasse 107, Graz, Austria
Filed Aug. 22, 1958, Ser. No. 756,660
Claims priority, application Germany July 26, 1949
8 Claims. (Cl. 230—130)

It is an object in the manufacture of multistage centrifugal compressors to form them with as few vertical impellers as possible, by using two or more shafts having different rotational speeds so as to achieve the most advantageous conditions per stage for the various impellers and thus to secure the highest degree of compression.

The invention relates to a new construction of multistage centrifugal compressor having the object above referred to and is of compact and simple design. The invention consists essentially in providing the impeller wheels and the various stages on both sides of a gear casing, the gear wheels through the motor serving to operate the compressor and the impeller wheels being secured on the respective ends of the gear shafts. The bearing is essentially simple if the impeller wheels provided at both sides are disposed to be overhung upon the ends of the gear shafts. The compressor housings may be secured, for example flanged, on the gear casing or may be constructed as a single unit. Furthermore, the invention affords an economy in the use of the same impeller wheels in the various stages, if the first impeller wheels on each shaft are constructed as double bladed wheels.

Apart from the advantage of requiring only a small space, and the exceptional weight decrease, the new construction results in particular in good bearings and working conditions, as the gear shafts serve at the same time both as impeller blades and gear wheels. The drive is transferred from the driving gear wheel through the pinion to each end of the shaft, the impeller wheels being fixed. This symmetrical drive in the two directions results in practical equal bearing on the whole tooth-width of the gears and when two pinions are employed in equal bearings on each pinion. It also follows for the same reason that all the forces passing through the impeller wheels operate at both sides of the gear centre, and therefore symmetrically with respect to the bearings. The shaft therefore moves uniformly in the bearings under all working conditions.

The critical speed can thus be controlled as desired by constructing the two impeller wheels at both sides of the bearing as found most suitable.

A further object of the present invention is to provide a multistage centrifugal compressor of the above type with air cooling and oil cooling means which are very conveniently arranged and which will not appreciably diminish the efficiency.

Still another object of the present invention is to provide a multistage compressor capable of providing for expansion and contraction of its components, where the compressor is of a large size, without in any way disturbing the operation of the compressor or detracting from its efficiency.

According to the invention the gear casing and the compressor housings on both sides of the gear casing are constructed as a single unit. Thus it is possible to construct the supporting base for the gear casing at the same time as an intermediate cooler for the compressed air produced or for other compressed gaseous media. The connecting pipes are short and the space required very small. Also the weight is decreased. The carrier member may be both oil cooler and oil container at the same time.

The invention is diagrammatically illustrated by way of example in the accompanying drawings.

Figure 2:
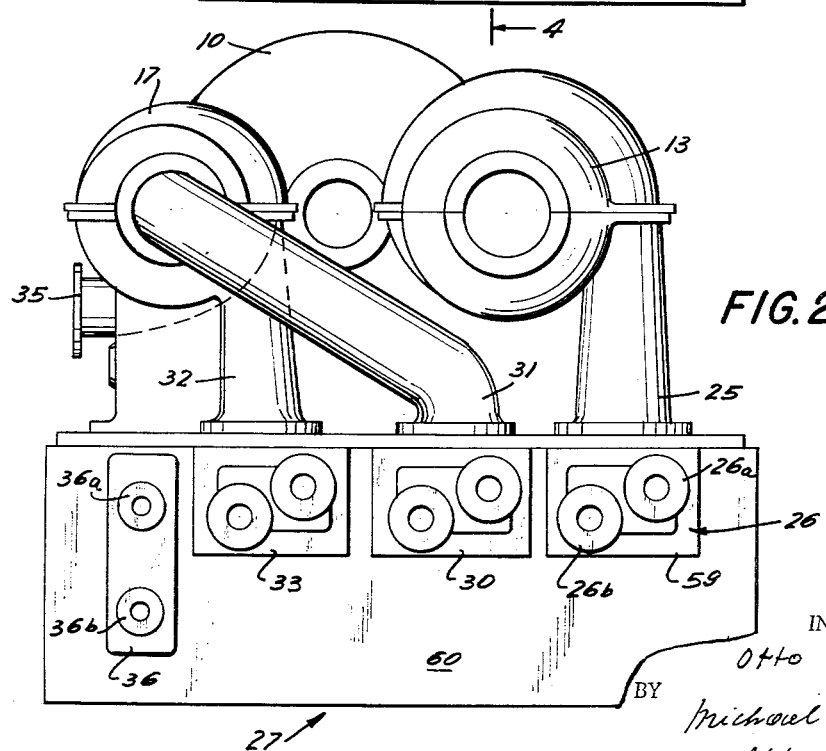
Figure 3:
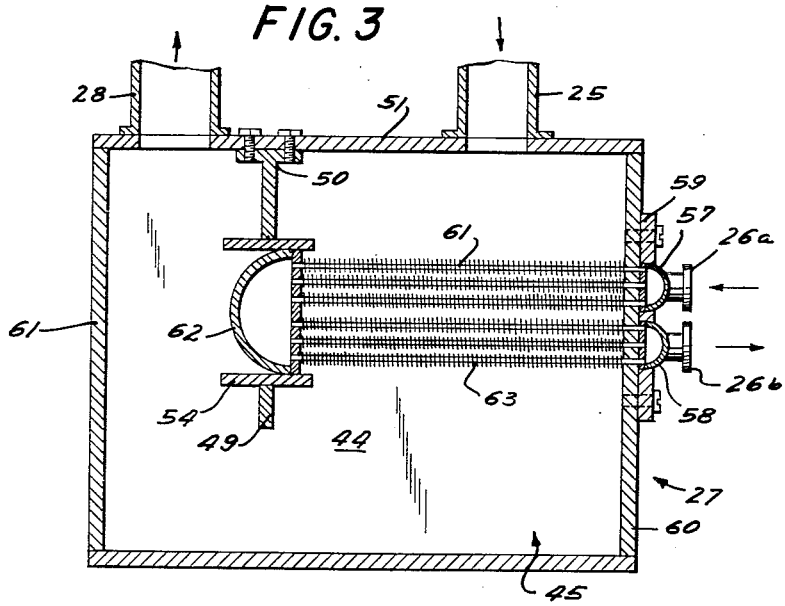
Figure 4:
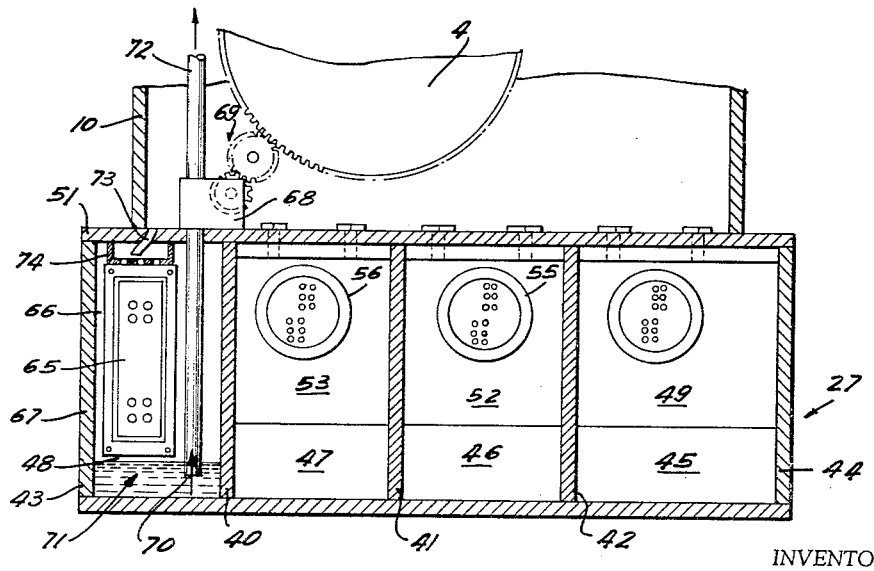

FIG. 1 shows a plan view of the compressor with the lid removed.
FIG. 2 shows a corresponding front elevation.
FIG. 3 is a sectional view taken along the line 3—3 of FIG. 1 in the direction of the arrows.
FIG. 4 is a sectional view taken along the line 4—4 of FIG. 1 in the direction of the arrows.
FIG. 5 is a fragmentary, transverse, partly sectional view, of another embodiment of the invention, the planes of FIGS. 3 and 5 being taken at the same relative positions in the embodiments of FIGS. 3 and 5, respectively.

The motor, which may be an electro-motor, a steam engine, a diesel engine, or the like operates through the coupling 2, the shaft 3, to drive the gear wheel 4. The gear wheel 4 drives first the pinion 5 mounted on the shaft 6, and also the pinion 7 mounted on the shaft 8. The gear wheels are provided in the gear casing 10. On the shaft 6 are secured the two impeller wheels 11 and 12 in such manner as to be overhung. They run in the respective housings 13 and 14. On the shaft 8 the impeller wheels 15 and 16 are similarly mounted; they rotate in the housings 17 and 18. The housings 13, 14, 17, 18 are secured at the respective flanges 19, 20, 21 and 22 to the gear housing 10. By means of the overhung bearing there are no obstructions in the form of shafts, stuffing boxes or the like on the suction side of the four compressor stages which might hinder the flow of the inflowing medium.

The air is drawn in by the first impeller wheel 11 through the inlet nozzle 24, air passing through the nozzle 25 into the intermediate cooler 26. The cooler 26 is provided in a box like carrier member 27, which replaces the more usual base-plate in such apparatus. The air which is cooled down and compressed during the first stage flows through the nozzle 28 towards the second impeller wheel 12, and is then led after further compression through the nozzle 29 to the second intermediate cooler 30. This also is provided in the box carrier member 27. The air is led to the next impeller wheel 15 through the pipe 31. The air flows through the nozzle 32 down to the intermediate cooler 33, leaving the cooler 33 through the outlet 34, to be compressed in the last stage by the impeller wheel 16. The air at end pressure leaves the compressor through the pressure nozzle 35.

The carrier member 27 not only supports the gear and the four compressor stages, as well as the three intermediate coolers 26, 30 and 33, but also serves as oil tank, and includes the oil cooler 36. All coolers are provided to fit into the front side of the carrier member 27 in the same way as a chest of drawers. They can be removed in the same way. By reason of the unit construction of the impeller wheels and the gears and the utilization of the base member for the gear, as intermediate cooler and oil cooler, very short air pipes are necessary, which means operating with little waste, and in much less space than is known. In the gear itself the well balanced distribution of a four stage compressor upon both sides of the gear results in the highest symmetry and with the best power distribution, and with the most satisfactory bearing of the parts.

As may be seen from FIGS. 3 and 4 the base 27 of the structure of FIGS. 1 and 2 is in the form of a hollow enclosure provided with a series of partitions 40, 41 and 42 extending completely across the interior of the enclosure 27, and being fluid-tightly connected with the top and bottom walls as well as the opposite side walls of the base 27. The base 27 further includes a front wall 43 and a rear wall 44 also extending completely across the base. The walls 42 and 44 define the front and rear limits of a fluid-tight chamber 45 in the base 27, and in the same way the walls 41 and 42 form the front and rear limits of a fluid-tight chamber 46 and the walls 40 and 41 form the front and rear limits of a fluid-tight chamber 47 and the walls 43 and 40 form the front and rear limits of a fluid-tight chamber 48. A wall 49 extends across the chamber 45 between and in fluid-tight engagement with the walls 42 and 44 thereof, and this wall 49 is provided at its top end with a flange 50 fixed to the top wall 51 of the base 27, as is shown most clearly in FIG. 3. Walls 52 and 53 which are identical with the wall 49 are located in the same way as the wall 49 respectively in the chambers 46 and 47. The wall 49 is formed with a circular opening in which a cylindrical sleeve 54 is fixed, and in the same way cylindrical sleeves 55 and 56 are fixedly carried by the walls 52 and 53, respectively.

Air cooling means 26 indicated in FIG. 2 is provided with an inlet connection 26a and an outlet connection 26b for any siutable cooling liquid. The connection 26a communicates with a header 57, while the connection 26b communicates with a header 58 and both of these headers are carried by a plate 59 bolted or otherwise removably fixed to the side wall 60 of the base 27. The header 57 communicates with a plurality of tubes 61 which lead from the header 57 to a header 62 in the form of a circular enclosure slidably supported by the cylindrical sleeve 54. A second group of tubes 63 lead from the header 62 back to the header 58. Thus, by disconnecting the wall 59 from the wall 60 the entire cooling means 26 may be removed from the base 27 in a very simple way, and of course it is mounted in the position shown in FIG. 3 very quickly and easily. The cooling means 30 and 33 are of the same construction as the cooling means 26.

As will be seen from FIG. 3, the discharge conduit 25 of the first stage compressor leads the air therefrom downwardly into the chamber 45, and the wall 49 which supports the inner end of the cooling means 26 also forms a baffle which forces the air from the conduit 25 to move past the cooling tubes 61 and 63 and downwardly along the bottom edge of the wall 49 before the air can flow upwardly through the inlet conduit 28 of the second stage compressor. In the same way the discharge conduit 29 of the second stage compressor will introduce the air into the chamber 46 on one side of the wall 52 so that this air must pass downwardly along the wall 52 before it can flow upwardly past the cooling means 30 to reach the supply conduit 31 for the first stage compressor. Thus, although the second cooling means 30 is of the same construction and is supported in the same way as the cooling means 26, the air flows in a reversed direction with respect to the second cooling means. Also, it is clear that the discharge conduit 32 of the third stage will lead the air downwardly to the chamber 47 to flow downwardly past the third cooling means 33 and around the bottom edge of the wall 53 before this air can flow upwardly through the conduit 34 to the fourth compressor stage.

The cooling means 36 for the oil also has a pair of connections 36a and 36b to the supply and discharge conduits of a suitable cooling liquid, respectively. These inlets 36a and 36b are respectively carried by a pair of headers which respectively communicate two sets of tubes leading to a common header 65 slidably carried by a rectangular flange member 66 fixed to the side wall 67 of base 27 which is opposite to the side wall 60, so that the cooling means 36 can also be very quickly and easily inserted into and removed from the base 27. A pump 68 is carried by the top wall 51 of the base within the drive housing 10 (FIG. 4), and this pump 68 is driven by a gear train 69 which in turn is driven by the main drive gear 4. This pump 68 has a suction conduit 70 whose bottom open end is immersed in an oil bath 71 located in the lower portion of the chamber 48, so that the oil is sucked by the pump 68 out of the chamber 48. The pump delivers the oil through a pressure discharge conduit 72 to an upper portion of the housing 10 from where the oil drops downwardly along the gears and shafts so as to keep the components of the drive properly lubricated. The oil which settles to the bottom of the housing 10 flows through a conduit 73 carried by the wall 51 into a trough 74 fixedly carried by the opposite side walls 60 and 67 of the housing 27 within the chamber 48 over the tubes of the cooling means 36, and this trough 74 is formed in its bottom wall with a plurality of apertures through which the oil flows so that the oil falls downwardly onto the tubes of the cooling means 36 to be cooled thereby, and the oil then falls from the tubes back to the bath 71.

It will be noted that with the above described structure not only is the entire assembly simple and compact, but also the air which flows from stage to stage of the compressor is deflected to a minimum extent and has an extremely short path of movement so that the efficiency of the multistage compressor of the invention is diminished, if at all, to only an extremely small degree as a result of friction losses due to the movement of the compressed air from stage to stage with cooling between the stages.

The above described structure of FIGS. 1–4 is suitable for most installations where relatively large compressors are not required. In the case where large installations are required, an embodiment as illustrated in FIG. 5 may be used.

As may be seen from FIG. 5, the base 80 of the compressor is provided with a plurality of bolts 81 suspended therefrom and carrying nuts 82 at their bottom ends, and these nuts support heavy springs 83 which are coiled about the bolts 81. The top ends of the springs 83 bear against brackets 84 formed with openings through which the bolts 81 pass, respectively, and these brackets 84 are fixed, as by welding or the like, to conduits 85, one of which is visible in FIG. 5. Three conduits 85 and the bolts and springs as well as brackets supporting the same are provided for the four-stage compressor of the invention, and FIG. 5 illustrates the conduit 85 which leads the air from the first to the second stage of the compressor. Thus, the discharge conduit 25' from the first stage is fixed to the inlet end of the conduit 85, while the supply conduit 28' of the second stage leads from the conduit 85, the conduits 25' and 28' corresponding respectively to the conduits 25 and 28. The top wall 86 of the base 80 of the embodiment of FIG. 5 carries a multistage compressor arrangement identical with that shown in FIGS. 1 and 2 except that it is larger, and of course the conduits leading to and from the several compressors pass through the wall 86 of the base 80. At its lowermost portion the conduit 85 is formed with an opening through which a cooling means 87 may be introduced and fixed fluid-tightly and removably to the lowermost part of the conduit 85 as illustrated in FIG. 5, and the cooling means 87 may be identical with the cooling means 26 except that it is larger. Suitable vanes 88 are arranged in the conduit 85 to guide the air through the cooling means. The second and third cooling means of the embodiment of FIG. 5 are identical with that shown in FIG. 5 and cooperate with the compressor in the same way as the cooling means 30 and 33, respectively.

It is apparent from FIG. 5 that due to the resilient yieldable support of the air cooling means the latter together with the conduits leading to and from the same is free to expand and contract due to temperature changes without in any way interfering with the operation of the compressor. Also it is apparent that the embodiment of FIG. 5 still retains the advantages of short paths of movement of the air with a minimum deflection.

An oil chamber 90 is fixed to the underside of the wall 86 and a suitable pump and conduit means cooperates with this oil chamber to circulate the oil in the manner described above, and the oil of the embodiment of FIG. 5 may be cooled in any suitable way. The oil pump of the embodiment of FIG. 5 also may be driven in the same way as the pump 68 shown in FIG. 4.

This application is a continuation-in-part application of my co-pending application Serial No. 140,907, filed November 16, 1949, now abandoned, and entitled Multistage Centrifugal Compressor.

It will be understood that each of the elements described above, or two or more together, may also find a useful application in other types of compressors differing from the types described above.

While the invention has been illustrated and described as embodied in multistage compressors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a multistage compressor, in combination, first and second stage compressors arranged on a first common axis; third and fourth stage compressors arranged on a second common axis parallel to said first axis; elongated first, second and third air cooling means extending parallel to each other and to said axes with said first air cooling means located nearer to said first axis than said third cooling means and said third cooling means located nearer to said second axis than said first cooling means and said second cooling means located between said first and third cooling means; a first stage discharge conduit leading from said fisrt stage compressor to an inlet of said first air cooling means; a second stage supply conduit leading from an outlet end of said first cooling means to an inlet of said second stage compressor; a second stage discharge conduit leading from said second stage compressor to an inlet end of said second cooling means; a third stage supply conduit leading from an outlet end of said second cooling means to an inlet of said third stage compressor; a third stage discharge conduit leading from said third stage compressor to an inlet of said third cooling means; and a fourth stage supply conduit leading from an outlet of said third cooling means to an inlet of said fourth stage compressor.

2. In a compressor as recited in claim 1, said first and second axes being located at substantially the same elevation and said first, second and third cooling means being located at substantially the same elevation beneath said compressors.

3. In a compressor as recited in claim 2, said first and third stage compressors being located in a common first vertical plane and said second and fourth stage compressors being located in a common second vertical plane parallel to said first vertical plane.

4. In a multistage compressor having at least four successive stages, in combination, a base having a top wall; a drive housing having axially opposed side walls mounted on and extending upwardly from said top wall; a main drive gear rotatable in said drive housing; a pair of pinions of different diameters respectively meshing with diametrically opposite portions of said main gear; a drive shaft fixed coaxially to each pinion and extending on opposite sides of the respective pinion through and beyond said axially opposed side walls of said drive housing so that the ends of each drive shaft are located outside of said housing on opposite sides thereof; separate centrifugal compressor units respectively including impellers fixed to said ends of said drive shafts and compressor housings having oppositely directed axial inlets respectively located beyond said drive shafts and tangential outlets, said compressor housings being located closely adjacent to and carried substantially by said axially opposed side walls of said drive housing, said centrifugal compressor units forming successive stages of said multistage compressor; and conduit means connecting the outlet of the housing of each compressor unit, except that which forms the last stage, with the inlet of the compressor unit forming the following stage, whereby a compact and perfectly balanced construction for a multistage compressor is obtained.

5. A multistage compressor as defined in claim 4 and including three air-cooling means carried by said base beneath said top wall thereof, and in which said conduit means communicate with said compressor housings and air-cooling means for directing air from the compressor housing which forms the first stage of the multistage compressor to the first of said cooling means, from said first cooling means to the inlet of the compressor housing which forms the second stage, from the latter housing to the second cooling means, from the second cooling means to the inlet of the compressor housing which forms the third stage, from the latter housing to the third cooling means, and from the latter cooling means to the inlet of the compressor housing which forms the fourth stage.

6. A multistage compressor as defined in claim 4 in which said side walls of said drive housing are formed at the portions thereof through which said drive shafts extend with tubular projections having an inner diameter greater than the diameter of the drive shaft ends respectively projecting therethrough and each of said tubular projections being formed at the outer end thereof with a flange, said compressor housings being respectively mounted on said flanges, and said compressor including a plurality of bearing means respectively located in said tubular projections for turnably supporting said drive shafts.

7. An arrangement as defined in claim 4 in which the impellers of the units forming the first and second stage are mounted on one common drive shaft and the impellers of the units forming the third and fourth stage are mounted on the other drive shaft.

8. A multistage compressor comprising, in combination, a base; drive means carried by said base; a plurality of centrifugal compressors driven by said drive means; air cooling means carried by said base; conduit means interconnecting said compressors with said air cooling means for directing the air from each compressor except that which forms the final stage first through said air cooling means before the air reaches the compressor forming the next stage; and spring means carried by said base and resiliently and yieldably supporting said air cooling means and the portion of the conduit means connected therewith to provide for expansion and contraction of the air cooling means and conduit portion.

References Cited in the file of this patent

UNITED STATES PATENTS

| 1,086,755 | Curtis | Feb. 10, 1914 |
| 2,235,050 | Thege et al. | Mar. 18, 1941 |
| 2,361,726 | Weimar | Oct. 31, 1944 |
| 2,570,134 | Lancaster et al. | Oct. 2, 1951 |
| 2,602,583 | Haeberlein | July 8, 1952 |
| 2,612,310 | Eggmann | Sept. 30, 1952 |

FOREIGN PATENTS

| 102,821 | Switzerland | Jan. 2, 1924 |
| 480,352 | France | Apr. 29, 1916 |